(12) United States Patent
Heler

(10) Patent No.: US 6,910,016 B1
(45) Date of Patent: Jun. 21, 2005

(54) SYSTEM AND METHOD FOR IDENTIFYING THE WORKLOAD QUEUED BY A MONITOR

(75) Inventor: Jean-Jaques Heler, Palo Alto, CA (US)

(73) Assignee: Charles Schwab & Co., Inc., San Francisco, CA (US)

(*) Notice: Subject to any disclaimer, the term of this patent is extended or adjusted under 35 U.S.C. 154(b) by 709 days.

(21) Appl. No.: 09/425,748

(22) Filed: Oct. 22, 1999

(51) Int. Cl.[7] .............................................. G06F 17/60
(52) U.S. Cl. ..................... 705/8; 705/1; 705/7; 705/9; 705/10; 705/11; 705/2; 379/111; 379/112.05; 379/112.06
(58) Field of Search ........................ 705/8, 10, 1, 2, 705/7–11; 379/111, 112.05, 112.06

(56) References Cited

U.S. PATENT DOCUMENTS 5,220,674 A * 6/1993 Morgan et al. ............. 709/223
6,067,545 A * 5/2000 Wolff .......................... 707/10
6,157,655 A * 12/2000 Shtivelman ................. 370/412

FOREIGN PATENT DOCUMENTS

DE            2811397 A  *  3/1978  ............ G06C/3/00

OTHER PUBLICATIONS

Sulkin, Allen. Empowering Call Center Agents—Business Communications Review. v24, n12, p20. Dec. 1994, Retrived on DIALOG.*

* cited by examiner

Primary Examiner—James P. Trammell
Assistant Examiner—James A. Reagan
(74) Attorney, Agent, or Firm—Innovation Partners; Charles E. Gotlieb (57) ABSTRACT

A method and apparatus identifies the status of a system by determining average queue waiting periods of commands in one or more queues, and identifying the trend of average queue waiting periods over time.

20 Claims, 7 Drawing Sheets

FIG. 7

SYSTEM AND METHOD FOR IDENTIFYING THE WORKLOAD QUEUED BY A MONITOR

FIELD OF THE INVENTION

The present invention is related to computer software and more specifically to computer software for monitoring the operation of other computer software.

BACKGROUND OF THE INVENTION

Many data processing systems use a monitor process to direct the flow of work. The monitor process receives requests for work to be performed and assigns the work to a server process. Some monitor processes have sufficient intelligence to select the proper server process to which the work will be assigned based on the request received. Some monitor processes record certain information about the request received. For instance, the request itself may be recorded to allow the request to be reimplemented if the monitor process receives a redo request. The monitor may maintain information sufficient to remove the effect of the implemented request in the event the monitor receives an undo request. Other information about the implemented request, referred to as a transaction, may also be recorded by the monitor.

Because the monitor may receive requests faster than the server processes can implement them, some conventional monitors operate a queue. When the request is received, it is placed in a queue. If the monitor will receive commands for many types of server processes, the monitor may place the request in one of several queues based on one or more attributes of the request. A server process may either take the request from its monitor queue, or signal the monitor to provide the next request from that queue.

Some conventional monitors can adjust the load of the queue by starting and stopping more server processes. For example, if there are two types of processes, A and B, and there are 4 A processes and 4 B processes running on a server, if the queue for the B processes has 100 pending requests and the queue for A processes has none, the monitor process can instruct the server to terminate two of the A processes and initiate two more of the B processes. The monitor process may run the server processes in this configuration until the number of requests in the queue for A processes exceeds the number of requests in the queue for B processes. However, in some circumstances, requests arrive to the monitor process so much more quickly than they can be processed by the available server processes that the monitor process is unable to add sufficient capacity. As a result, the average length of time a request is in the queue will grow over time, which may be seen as an increase in response time by a user.

Some conventional monitor processes allow a requesting process to request information about the queue. For example, some conventional monitor processes timestamp each request when it is placed into the queue. The monitor will provide in response to an appropriate request the number of entries in one or all queues, and can provide the timestamps of each request in the queue. This capability allows the requesting process to identify when response times are becoming unacceptably large so that appropriate measures may be taken to maintain an acceptable level of service. For example, if a queue size reaches a particular threshold, an operator may be alerted so that additional server capacity may be made available to the monitor. Another way to deal with an unacceptable response time is to refuse to allow additional users access to the system containing the monitor and server processes until the response time reaches an acceptable level.

Refusing access to a system can frustrate users and so additional accuracy is required before such a drastic step is taken. For example, if response times exceed a threshold for refusing access, but are declining, it may not be necessary to deny access to a user in order to maintain a certain level of service. Furthermore, steadily increasing response times could signal a need to refuse additional users access to the system even before the response times hit the threshold.

What is needed is a system and method for identifying the load of a system served by a monitor responsive to trends in the load.

SUMMARY OF INVENTION

A method and apparatus identifies average queue waiting periods for pending requests of a system, identifies the trend of the average queue waiting periods and provides status according to the trend and one or more of the average queue waiting periods. The trend may be identified by comparing the most recent average queue waiting period with the immediately preceding average queue waiting period. The average queue waiting periods may be computed in a two step process: first a set of one or more queues are periodically sampled and an average waiting time for the set of queues is computed at each sampling period; next the system average queue waiting periods are periodically computed by aggregating several of these averages over time and even across multiple sets of queues. Thus, the system average waiting period can correspond to the average queue waiting period for more queues than are in one set. An insufficient number of average queue waiting periods from a particular set can cause all average queue waiting periods from that set to be omitted when computing the system average queue waiting period; if too many sets are rejected, the system average is omitted for the period. The status of the system can be identified by comparing an average of the system averages to one or more thresholds if the trend identified is fluctuating across a period of time. The status of the system can be identified by comparing a recent system average with one or more thresholds if the trend is consistent over a period of time.

DETAILED DESCRIPTION OF A PREFERRED EMBODIMENTS

Figure 1:
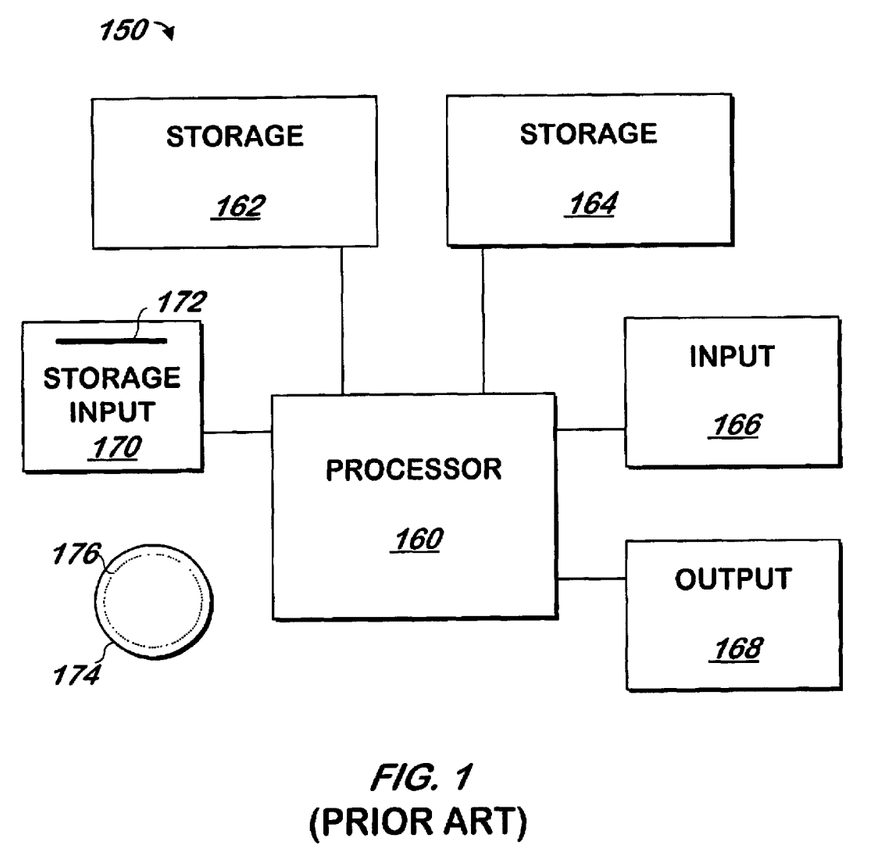
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., although other systems may be used.

Figure 2:
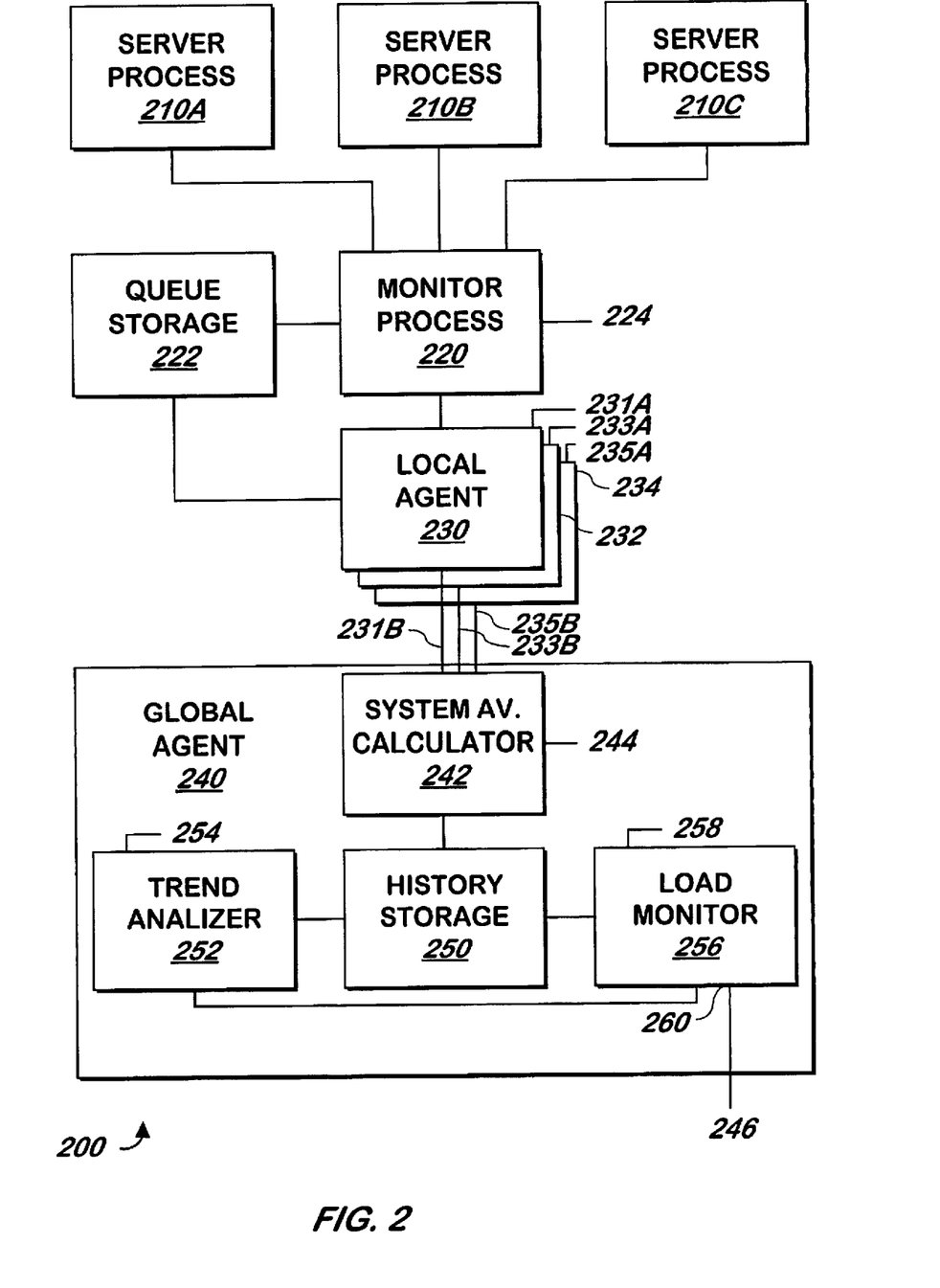
FIG. 2 is a block schematic diagram of a system for identifying the load of a system served by a monitor according to one embodiment of the present invention.

Referring now to FIG. 2, a system 200 for identifying the load of a system served by a monitor is shown according to one embodiment of the present invention. Monitor process 220 is a conventional monitor process as described above. Monitor process 220 accepts at input/output 224 requests for service as described above, and, if no server process 210A, 210B, 210C is available to handle the request, queues the request in queue storage 222, timestamping the request when it is queued to record the time of receipt or another similar time. Requests are ultimately processed by server processes 210A, 210B, 210C as described above.

Local agent 230 periodically identifies the average waiting period of some or all of the requests in one or more of the queues in queue storage 222. Each server process 210A, 210B, or 210C may have its own queue in queue storage 222 or some or all server processes may share one or more queues. In one embodiment, two parameters, the sample size and interval, described below, are received by local agent 230 via input 231A. Local agent 230 identifies the average queue waiting period by performing the method described in FIG. 3 below, and the average time is provided at input/output 231B.

Figure 3:
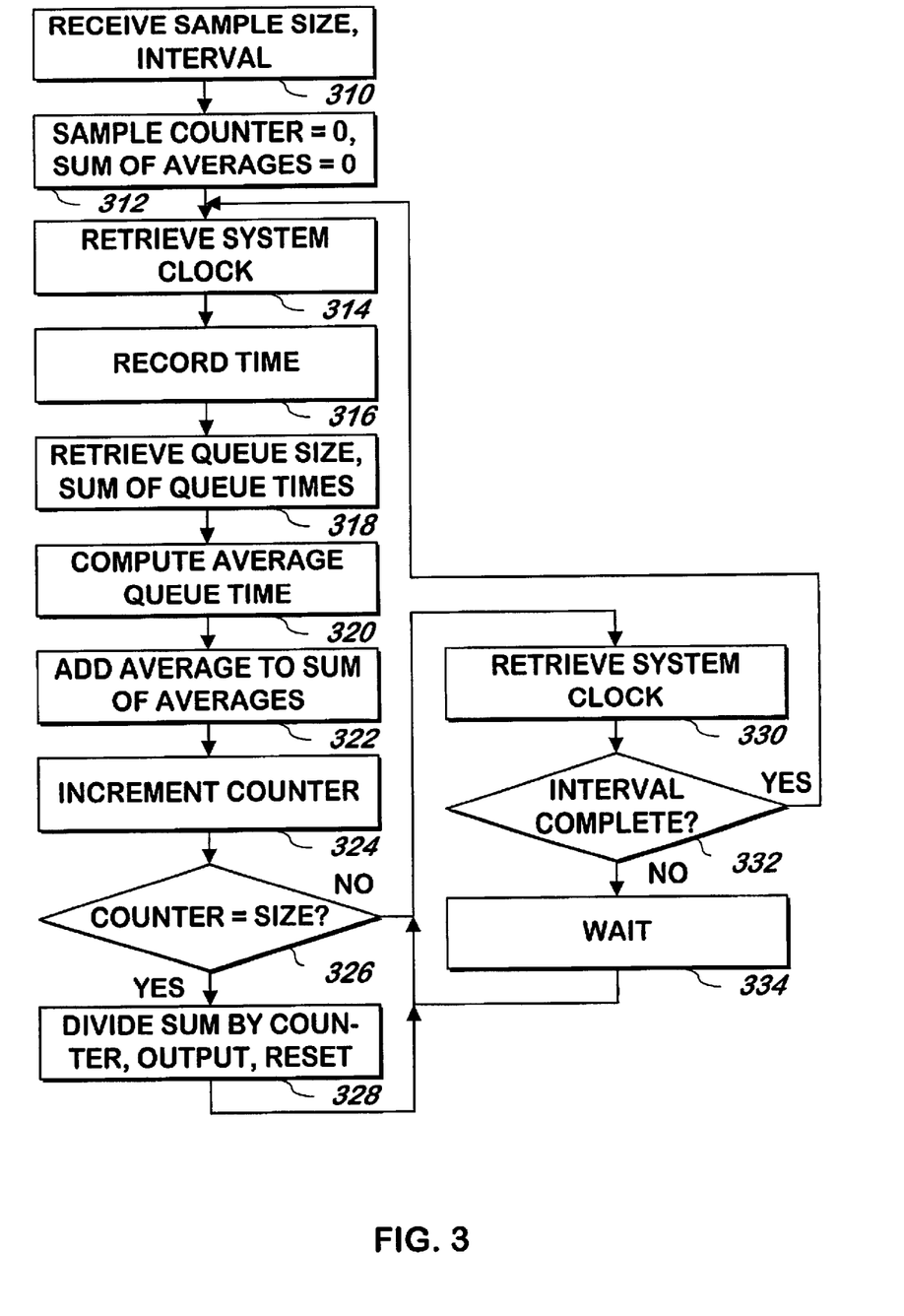
FIG. 3 is a flowchart illustrating a method of computing an average queue waiting period according to one embodiment of the present invention.

Referring now to FIG. 3, a method of computing an average queue waiting period is shown according to one embodiment of the present invention. The two parameters, a sample size and interval, are received 310. In one embodiment, the sample size and interval are not received, because they are constants or otherwise calculated. As described herein, the sample size and interval are received, but if they are constants or calculated, those values are used in place of the received values.

A sample counter and sum of averages are initialized to 0 312. The system clock is retrieved 314 and stored 316 in one embodiment. In another embodiment, in place of steps 314 and 316, a timer is set to expire at the end of the interval received in step 310. The queue timestamps and number of requests in the queue are retrieved 318. In one embodiment, the retrieval of step 318 is performed by requesting such information from the monitor process. In another embodiment, the retrieval of step 318 is performed by directly accessing the queue, which may be a shared area of memory.

The average queue waiting period is computed 320. The average queue waiting period may be computed by requesting the system clock, subtracting each queue time to compute a length of time in the queue for each request, summing the queue times, and dividing the sum of the queue times by the number of requests in the queue. The average queue waiting period may be added 322 to the sum of averages and a counter incremented 324. The method continues at step 326.

At step 326, if the counter is not equal to the size received in step 310, the method continues at step 330. If the counter is equal to the size received in step 310, the sum of averages is divided by the value of the counter to produce an average value of the queue waiting period during the interval, and this value is output 328. The counter and sum of averages are reset to zero 328.

The system clock is retrieved 330 and the method continues at step 332. At step 332, if the difference between the system clock and the time recorded in step 316 is greater than or equal to the interval received in step 310, the interval is complete and the method continues at step 314. Otherwise the method optionally waits 334 and continues at step 330. The operation of a timer may be used in place of steps 330–334. In such embodiment, the method continues at step 314 when the timer set as described above elapses.

Referring again to FIG. 2, each local agent 230, 232, 234 performs the measurements of the average queue waiting period described above with reference to FIG. 3 and provides the output to global agent 240. Global agent 240 can receive the outputs from one or more local agents 230, 232, 234. As illustrated in FIG. 2, there are three local agents 230, 232, 234, one for each server process 210A, 210B, 210C, although any number of local agents may feed a Global agent and a local agent 230, 232 or 234 can monitor one or more queues for each of one or more server processes 210A, 210B, 210C. Each local agent 230, 232 or 234 can retrieve information from a different monitor process or the same monitor process 220 as another local agent 230, 232, or 234. Each of the local agents 232, 234 has an input 233A, 235A an output 233B, 235B similar to input 231A and output 231B.

Global agent 240 contains system average calculator 242, history storage 250, trend analizer 252 and load monitor 254, each described below.

System average calculator 242 computes the system average queue waiting period using the average queue waiting periods output by one or more local agents 230, 232, 234 using several measurements from each local agent as described below with respect to FIG. 4. The system average queue waiting period is the average length of time requests are in all or some of the queues monitored by monitor process 220 during a period in which more than one average queue waiting periods were computed for a particular queue or set of queues. To assist with calculation of the system average waiting period, system average calculator 242 receives any number of parameters described below at input 244. In one embodiment, all of the inputs that receive parameters including inputs 231A, 233A, 235A, 244 are coupled to a conventional keyboard and mouse, although these inputs may be coupled to receive one or more files in another embodiment.

Figure 4:
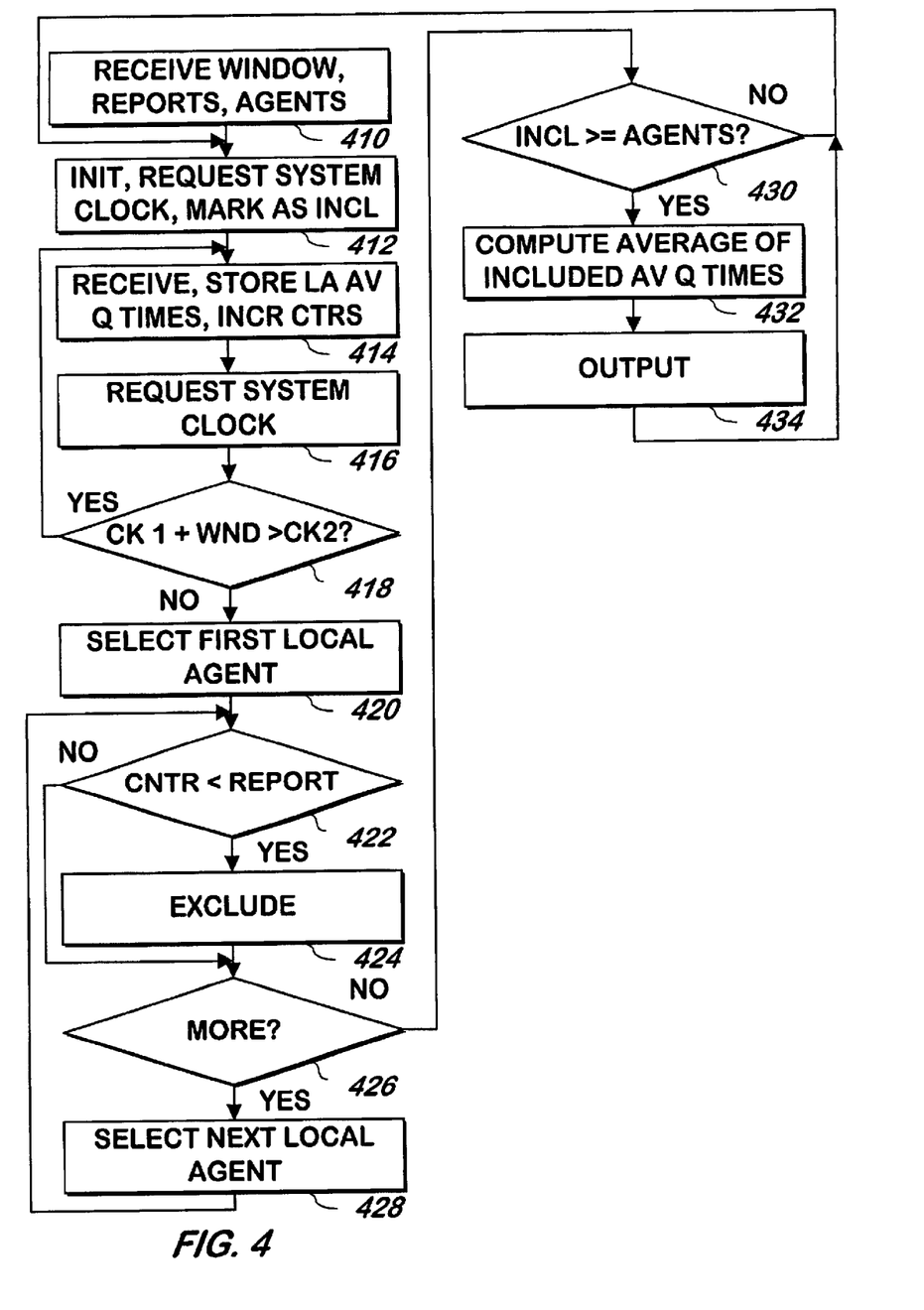
FIG. 4 is a flowchart illustrating a method of computing system average queue waiting period from average queue waiting periods computed in FIG. 3 according to one embodiment of the present invention.

Referring now to FIG. 4, a method of computing a system average waiting period from average queue waiting periods supplied by one or more local agents is shown according to one embodiment of the present invention. Three parameters, a window, a report and an agent, are received 410. In one embodiment, one or more of the parameters are not received, but are computed, constants or implied.

An initialization process, which marks each local agent as being "included" and can initialize stored average queue time variables and counter variables to zero 412 is performed. The system clock is requested 412, received and stored.

Average queue waiting periods are received and stored from each of the local agents 414 as described above, the average queue waiting periods having been measured and output as described above with respect to FIGS. 2 and 3. The average queue waiting periods are received in a manner that allows the identification of the local agent supplying the average queue waiting period, and each average queue waiting period is stored associated with other average queue waiting period received from that local agent. As an average queue waiting period is received from a local agent, a counter for that local agent is incremented as part of step 414.

The system clock is requested and received again 416. If the system clock received in step 412 plus the window parameter received in step 410 is greater than the system clock received in step 416, the method continues at step 414. Otherwise; the method continues at step 420.

In one embodiment, the report parameter identifies, for each local agent, the minimum number of average queue waiting periods that are expected from that local agent within the window period received in step 410. This number can be calculated for each local agent by dividing the window period by the interval for that local agent and rounding down. The report parameter can be the same for multiple local agents or can be different for each local agent. If the number of average queue waiting periods received from that local agent is not at least the minimum specified for that agent, the local agent is considered unreliable during the window period. In such embodiment, the average queue waiting period received from that local agent during the window period are not used to compute the system average queue waiting period from all of the local agents. Steps 420 through 428 enforce this restriction as described below.

The first local agent is selected 420. If the counter for the selected local agent is less than the report parameter specifies for that local agent 422, the local agent is marked as excluded 424 in place of being marked as included. If there are more local agents 426, the next local agent is selected 428 and the method continues at step 422. When the counter is compared against the report parameters for all local agents, the method continues at step 430.

In one embodiment, the agents parameter received in step 410 specifies a minimum number of local agents that must be marked as included for the calculations to be considered reliable. If the number of local agents marked as included is less than the agents parameter 430, the method continues at step 412. Otherwise, the average of all average queue waiting periods are calculated 432 by summing the average queue waiting periods received from all local agents marked as included and dividing by the sum of the counters for those local agents. The calculated average is output 434 as a system average queue waiting period and the method continues at step 412.

Thus, referring again to FIG. 2, local agents 230, 232, 234 can measure and provide the average queue waiting period of a particular queue, and system average calculator 242 takes the average queue waiting period from one or more local agents 230, 232, 234 to provide an average queue waiting period over a longer period than that used by local agents 230, 232, 234 and which may encompass more than one local agent. For example, system average calculator 242 may compute the average queue waiting period for an entire system if a sufficient number of local agents 230, 232, 234 are coupled to the system average calculator 242. In one embodiment, both the local agents 230, 232, 234 and the system average calculator 242 perform their methods repeatedly to provide continuous measurements of the average queue length of system 200.

System average calculator 242 provides its output to history storage 250, which may be conventional memory or disk storage. History storage 250 is arranged as a double or circular buffer. System average calculator 242 stores each output it provides in successive storage locations in history storage 250. When system average calculator 242 reaches the last storage location in history storage, it begins again at the first location, overwriting what was there. System average calculator 242 maintains an indication of the next storage location in history storage 250 into which it will store its next output.

Trend analyzer 252 retrieves the outputs from history storage 250 and attempts to discern the trend of the system average queue waiting periods. Trend analyzer 252 receives at input 254, which is coupled to any conventional input device such as a keyboard and mouse, the sample history parameter. The sample history parameter is the number of data points that trend analyzer 252 will use to analyze the trend. Trend analyzer 252 analyzes the trend as described below in FIG. 5.

Figure 5:
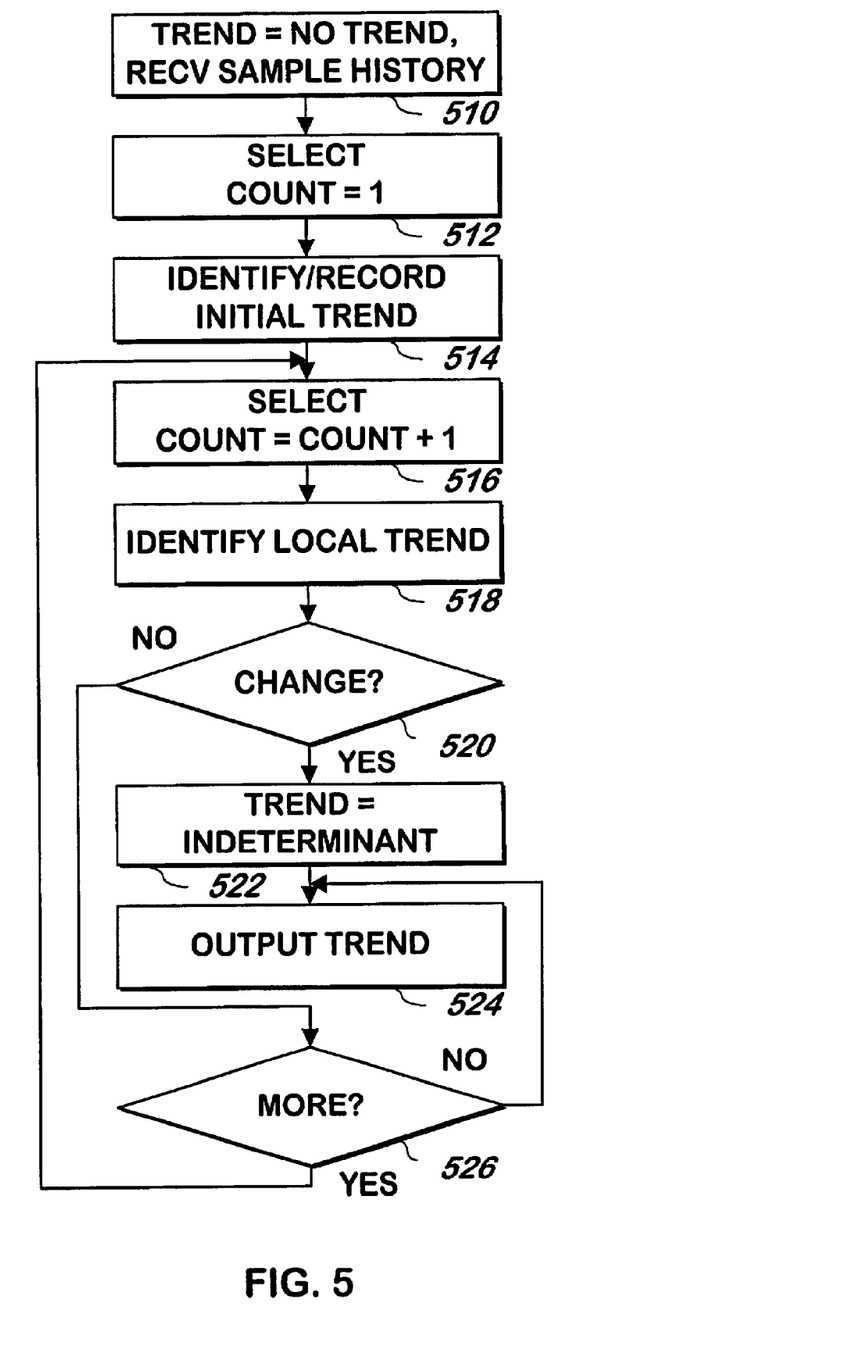
FIG. 5 is a flowchart illustrating a method of analyzing a trend according to one embodiment of the present invention.

Referring now to FIG. 5, a method of analyzing a trend is shown according to one embodiment of the present invention. The trend is initialized to "no trend" and the sample history parameter is received 510. The most recent system average queue waiting period is selected 512 and a counter is initialized 512 to a value of 1. In one embodiment, step 512 includes marking the selected system average queue waiting period because during the performance of the method of FIG. 5, other average queue waiting periods may be added to the set of average queue waiting periods as described above.

The trend between the selected average queue waiting period and at least one other average queue waiting period is identified and recorded as the initial trend 514. In one embodiment, the trend is identified by computing the difference between the selected average queue waiting period and the average queue waiting period immediately preceding the selected average queue waiting period, although other techniques such as smoothing may be used, and more than two average queue waiting periods may be used to compute the trend. In one embodiment, the trend identified in step 514 may be either increasing, decreasing or flat. The trend is increasing if the average queue waiting period selected in step 512 is higher than the immediately preceeding average queue waiting period.

The next most recent average queue waiting period is selected and the counter is incremented 516. The trend between the average queue waiting period selected in step 516 and one or more preceeding queue waiting periods (such as the system average queue waiting period immediately preceeding the one selected in step 516 is identified 518 using the same technique as was used in step 514. If the trend is different 520 from the trend identified in step 514, the trend is marked 522 as indeterminant and the trend is output 524. If there are more average queue waiting periods 526 (that is, the counter is less than the sample history received in step 510), the method continues at step 516. Otherwise, the trend is output 524.

Referring again to FIG. 2, in one embodiment, trend analyzer 252 sets a timer to periodically recalculate the trend. The timer may be internal to trend analyzer 252 or may be part of an operating system, not shown.

Referring again to FIG. 2, trend analyzer 252 outputs the trend to load monitor 256. Load monitor receives the trend from trend analyzer 252 and the sample history at input 258. Load monitor 256 optionally receives at input 258 the thresholds Q1, Q2, IY, IG, GR and DY used as described above. Input 258 may be coupled to any conventional input device such as a keyboard or mouse, or to receive a file. In another embodiment, the thresholds may be calculated, constants, or implied. When load monitor 256 receives a trend, load monitor 256 performs the method of calculating the load of the system 200 described in FIG. 6 below. Because the trends are periodically received from trend analyzer 252, load monitor 256 periodically performs the method of FIG. 6 each time a new trend is received.

Figure 6:
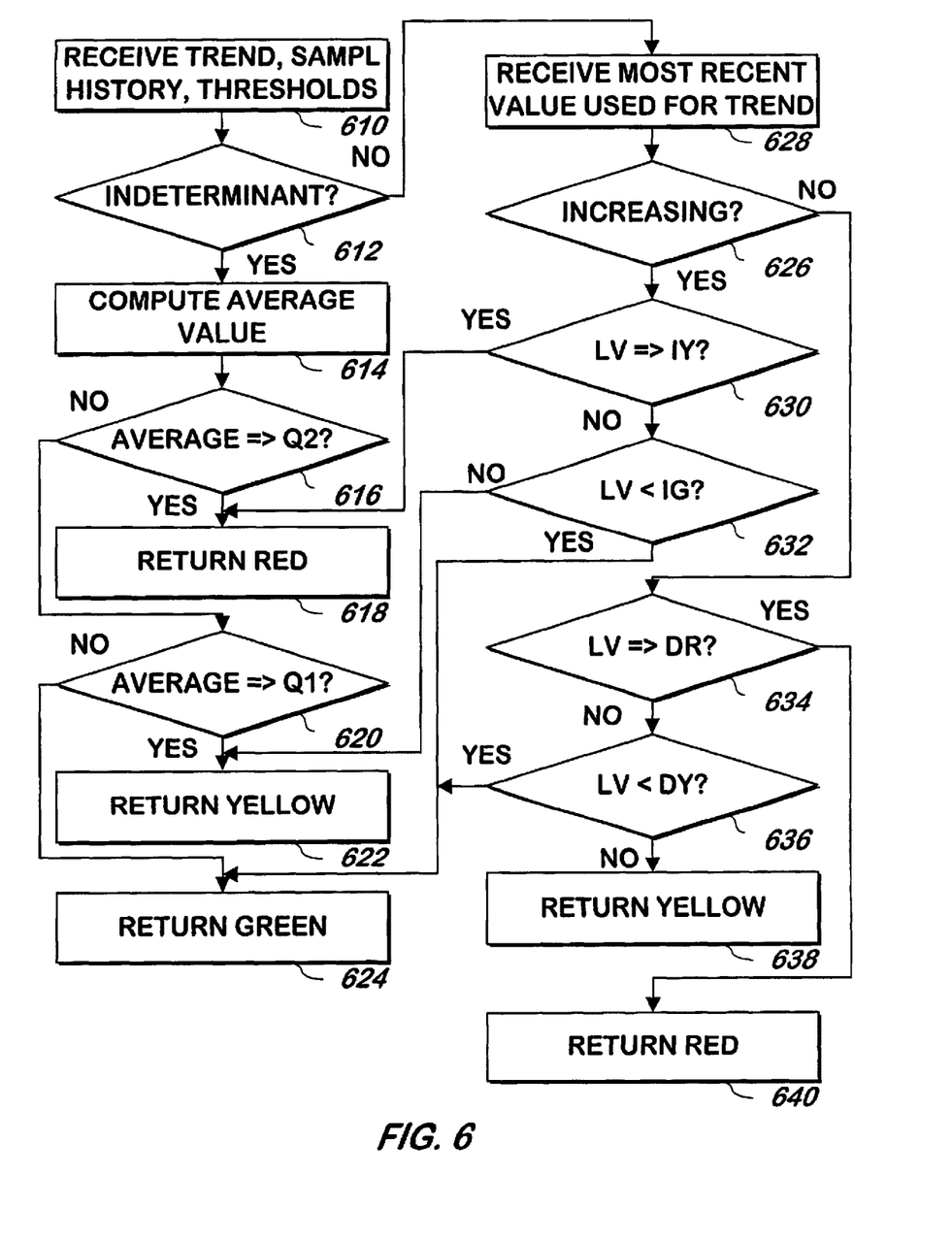
FIG. 6 is a flowchart illustrating a method of calculating the load of the system according to one embodiment of the present invention.

Referring now to FIG. 6, a method of calculating the load of the system is shown according to one embodiment of the present invention. The trend and sample history is received as described above. Thresholds Q1, Q2, IY, IG, GR and DY, described below, may be optionally received as part of step 610.

If the trend received is indeterminant 612, an average value is computed 614. The average value is computed in one embodiment by summing the average queue waiting periods beginning with the most recent average queue time used to compute the trend and marked as described above with respect to FIG. 5. The number of average queue waiting periods summed is equal to the sample history parameter received as described above. The average is computed in step 614 by dividing the sum by the sample history parameter.

If the average is greater than or equal to the Q2 threshold 616, a red status is output. Otherwise, if the average is greater or equal to the Q1 threshold 620, a yellow status is output 622. Otherwise, a green status is output 624. In one embodiment, Q2 is greater than Q1.

If the trend is not indeterminant 612, the method continues at step 626. The most recent value used to compute the trend (which may be marked as described above) is retrieved 626. This value will be referred to as the "latest value" below. If the trend is increasing 628, the method continues at step 630, otherwise, the method continues at step 634.

At step 630, if the latest value is greater than the IY parameter, the red status is output 618. Otherwise, if the latest value is less than the IG parameter 632, the green status is output 624 and otherwise the yellow status is output 622. In one embodiment, IY is greater than IG.

At step 634 if the latest value is greater than or equal to the DR parameter, the red status is output 640. Otherwise, if the latest value is less than the DY parameter 636, the green status is output 624, and otherwise the yellow status is output 638. In one embodiment, DR is greater than DY. In one embodiment, IG=20, Q1=25, DY=30, IY=40, Q2=45 and DR=50.

In one embodiment, the status indicators, red, yellow or green are output by load monitor 256 via output 260, which is coupled to the output 246 of global agent 240.

Figure 7:
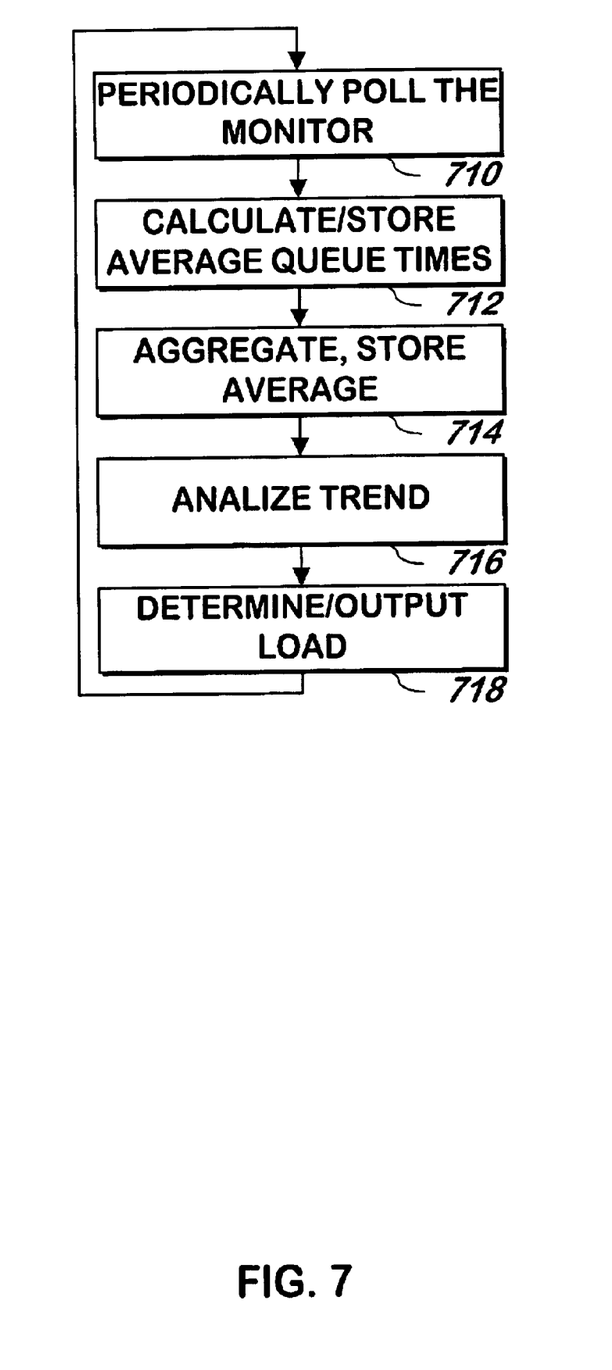
FIG. 7 is a flowchart illustrating a method of identifying the load of the system according to one embodiment of the present invention.

Referring now to FIG. 7, a method of identifying the load of a system served by a monitor is shown according to one embodiment of the present invention. The monitor is polled and an average queue waiting period is calculated for one or more queues and stored as described above 710, 712. In one embodiment, steps 710 and 712 repeat independently of the other steps as described above, with several average queue waiting periods stored at any given time. In one embodiment, steps 710 and 712 are duplicated for each of several sets of one or more processes operated by the monitor as described above.

An system average queue waiting period is calculated 714 from the average queue waiting periods stored in step 712 as described above. In one embodiment, step 714 repeats independently of the other steps as described above so that several system average queue waiting periods are stored at any given time as described above.

The trend is analyzed 716 as described above and the load is determined and output 718 as described above. In one embodiment, steps 716 and 718 repeat independently of the other steps as described above so that the load is output periodically. In another embodiment, the load is calculated as described above only on demand. The load may be used to restrict access to one or more servers, to report status or for any other reason.

What is claimed is:

1. A method of identifying a status of a system, comprising:
   electronically computing a plurality of first queue waiting periods, each related to an amount of time at least one request waits for service;
   identifying a trend responsive to at least two of the plurality of first queue waiting periods; and
   providing a status responsive to the trend identified and at least one of the plurality of first queue waiting periods computed.

2. The method of claim 1 wherein:
   the first queue waiting periods have an order; and
   the identifying step comprises comparing a first first queue waiting period with at least one second first queue waiting period immediately preceding the first first queue waiting period.

3. The method of claim 1, wherein the computing step comprises:
   computing a plurality of second queue waiting periods; and
   computing an average of the plurality of second queue waiting periods.

4. The method of claim 3, wherein:
   at least one of the plurality of first queue waiting periods corresponds to a wait time for requests in a first number of at least one queue;
   at least one of the plurality of second queue waiting periods corresponds to a wait time for requests in a second number of at least one queue; and
   the second number is lower than the first number.

5. The method of claim 3, wherein the computing step additionally comprises rejecting at least one second queue waiting period responsive to a number of second queue waiting periods received from at least one queue lower than a threshold.

6. The method of claim 1, wherein the providing step comprises:
   computing an average of an averaging plurality of the first queue waiting periods; and
   providing the status responsive to the average and a threshold.

7. The method of claim 1, wherein the providing step comprises:
   responsive to the trend identified having a first state:
      computing an average of the first queue waiting periods; and
      providing the status responsive to the average of the first queue waiting periods computed and a first threshold; and
   responsive to the trend identified having a second state:
      providing the status responsive to at least one of the first queue waiting periods and a second threshold.

8. A computer program product comprising a computer useable medium having computer readable program code embodied therein for identifying a status of a system, comprising:
   electronically computer readable program code devices configured to cause a computer to compute a plurality of first queue waiting periods, each related to an amount of time at least one request waits for service;
   computer readable program code devices configured to cause a computer to identify a trend responsive to at least two of the plurality of first queue waiting periods; and
   computer readable program code devices configured to cause a computer to provide the status responsive to the trend identified and at least one of the first queue waiting periods.

9. The computer program product of claim 8 wherein:
   the first queue waiting periods have an order; and
   the computer readable program code devices configured to cause a computer to identify comprise computer readable program code devices configured to cause a computer to compare a first first queue waiting period with at least one second first queue waiting period immediately preceding the first first queue waiting period.

10. The computer program product of claim 8, wherein the computer readable program code devices configured to cause a computer to compute comprise:
    computer readable program code devices configured to cause a computer to compute a plurality of second queue waiting periods; and
    computer readable program code devices configured to cause a computer to compute an average of the plurality of second queue waiting periods.

11. The computer program product of claim 10, wherein:
    at least one of the plurality of first queue waiting periods corresponds to a wait time for requests in a first number of at least one queue;
    at least one of the plurality of second queue waiting periods corresponds to a wait time for requests in a second number of at least one queue; and
    the second number is lower than the first number.

12. The computer program product of claim 10, wherein the computer readable program code devices configured to cause a computer to compute additionally comprises computer readable program code devices configured to cause a computer to reject at least one second queue waiting period responsive to a number of second queue waiting periods received from at least one queue lower than a threshold.

13. The computer program product of claim 8, wherein the computer readable program code devices configured to cause a computer to provide comprise:
    computer readable program code devices configured to cause a computer to, responsive to the trend identified having a first state:
       compute an average of an averaging plurality of the first queue waiting periods; and
       provide the status responsive to the average of the first queue waiting periods computed and a first threshold; and
    computer readable program code devices configured to cause a computer to, responsive to the trend identified having a second state:
       provide the status responsive to at least one of the first queue waiting periods and a second threshold.

14. An apparatus for identifying a status of a system comprising at least one queue comprising at least one request, the apparatus comprising:
    a global agent having an input coupled to the at least one queue for electronically computing and providing at an output a plurality of first queue waiting periods, each related to an amount of time at least one request waits in at least one of the at least one queue;
    a trend analyzer having an input coupled to the global agent output to receive at least one of the plurality of first queue waiting periods, the trend analyzer for identifying and providing at an output a trend responsive at least two of the plurality of first queue waiting periods; and
    a load monitor having a first input coupled to the trend analyzer output for receiving the trend, a second input coupled to the global agent output for receiving at least one of the plurality of first queue waiting periods, the load monitor for determining and providing at an output the status responsive to the trend and the at least one of the plurality of first queue waiting periods.

15. The apparatus of claim 14, wherein:
    the first queue waiting periods have an order; and
    the trend analyzer identifies the trend by comparing a first first queue waiting period and second first queue waiting period.

16. The apparatus of claim 14, additionally comprising:
    at least one local agent having an input coupled to the at least one queue, the local agent for computing and providing at an output coupled to the global agent input a plurality of second queue waiting periods; and
    wherein the global agent computes each first queue waiting periods by calculating at least one average of a plurality of the second queue waiting periods.

17. The apparatus of claim 16, wherein:
    at least one of the plurality of first queue waiting periods corresponds to a wait time for requests in a first number of at least one queue;
    at least one of the plurality of second queue waiting periods corresponds to a wait time for requests in a second number of at least one queue; and
    the second number is lower than the first number.

18. The apparatus of claim 16 wherein the global agent is additionally for rejecting at least one second queue waiting period responsive to a number of second queue waiting periods received from at least one queue lower than a threshold.

19. The apparatus of claim 14 wherein:

the load monitor is additionally for computing an average of an averaging plurality of first queue waiting periods; and the load monitor determines the trend responsive to the average it computes.

20. The apparatus of claim 14, wherein:

the load monitor is additionally for computing an average of an averaging plurality of the first queue waiting periods;

responsive to the trend identified having a first state, the load monitor determines the status responsive to the average of the averaging plurality of first queue waiting periods and a first threshold; and responsive to the trend identified having a second state, the load monitor determines the status responsive to at least one of the first queue waiting periods and a second threshold.

* * * * *